United States Patent [19]
Revels

[11] Patent Number: 5,635,057
[45] Date of Patent: Jun. 3, 1997

[54] END OF LINE SEWAGE FILTER

[76] Inventor: Micah M. Revels, 3041 Elliot St., Baltimore, Md. 21224

[21] Appl. No.: 543,375

[22] Filed: Oct. 16, 1995

[51] Int. Cl.⁶ ................................................. B01D 35/02
[52] U.S. Cl. ........................... 210/162; 210/232; 210/248; 210/314; 210/435; 210/455; 210/462
[58] Field of Search ................................. 210/232, 248, 210/162, 435, 455, 460, 462, 314

[56]         References Cited
         U.S. PATENT DOCUMENTS

| | | | |
|---|---|---|---|
| 3,633,218 | 1/1972 | Lekberg | 210/242.2 |
| 4,815,492 | 3/1989 | Tedei | 137/362 |
| 4,851,132 | 7/1989 | Di Leo | 210/770 |
| 5,322,629 | 6/1994 | Stewart | 210/455 |

*Primary Examiner*—Peter A. Hruskoci
*Assistant Examiner*—Betsey J. Morrison
*Attorney, Agent, or Firm*—Walter G. Finch

[57]            ABSTRACT

The device of the present invention is an end of the line sewage filter which comprises a metal framing that supports stainless steel walls, ceiling and floor and is built on and attached to a concrete platform. There is an oil filter mat which is placed on the floor of the structure to absorb some of the oil present in the sewage water. Holes in the floor of the device which align with holes in the concrete platform allow only the water and no trash or debris to exit the filter unit. Additionally, the filter unit is fitted with a door for easy access to the inside of the unit for cleaning.

7 Claims, 1 Drawing Sheet

END OF LINE SEWAGE FILTER

BACKGROUND AND SUMMARY OF THE INVENTION

The current sewer system is set up to collet run off water, etc. from storm drains and carry it off to dump in a stream, river, bay or ocean. Trash and debris often gets caught up in the flow of water and even thrown down the drains by careless people. This presents a severe environmental problem in that the trash and debris also end up in the streams, rivers, bays and oceans thereby polluting them.

Pollution has become a global problem and solutions are needed to prevent more trash and debris from being dumped into our vital water ways. One such solution is proposed in U.S. Pat. No. 4,935,132 issued to Schaier which teaches a drain pipe filter that is attached to individual storm drains and is formed of a wire cage which fits inside of an existing drain pipe. Attached to the wire cage is a series of oil absorbing fibers. Additionally, there is a helical coil at the entrance point of the cage which also has oil absorbing fibers attached. This trap is meant to be disposable and a new trap is put in when it becomes full. However, this just produces additional waste in used traps. Access points must be built into the sewage and drainage systems for putting in and changing the filter units. Also, these filters can only filter the water from a single drain.

Therefore, a filter for storm drains and the like is needed which can filter the flow from multiple storm drains as they flow to a single point, such as at the end of the sewer line which empties out into a water way. There is also a need for a filter which does not need to be removed when full, can be easily accessed for cleaning and has a replaceable oil trap.

The device of the present invention satisfies the above needs. It comprises a metal framing which supports the stainless steel walls and is built on, and is attached to a concrete platform. There is an oil filter mat which is placed on the floor of the structure to absorb some of the oil present in the sewage water. Holes in the floor of the device, which align with holes in the concrete platform, allow only the water and not the trash and debris to exit the filter unit.

Additionally, the filter unit is fitted with a door for easy access to the inside of the unit for cleaning. The filter unit is designed to be manually cleaned. The unit is bolted to the concrete platform and connected to the sewage line by a pair of flanges.

Therefore, it is an object of the present invention to provide for a sewage water filter which can filter the water coming from multiple storm drains and or sewage lines.

It is another object of this invention to provide for a sewage filter which can filter large amounts of water.

It is still a further object of this invention to provide for a sewage filter which incorporates an oil filtration mat.

It is yet another object of this invention to provide for a sewage filter which has easy access for cleaning.

BRIEF DESCRIPTION OF THE DRAWINGS

These and other intended objects, features and advantages of the invention will become more readily apparent from the following with reference to the accompanying drawings in which.

DETAILED SUMMARY OF THE DRAWINGS

Figure 1:
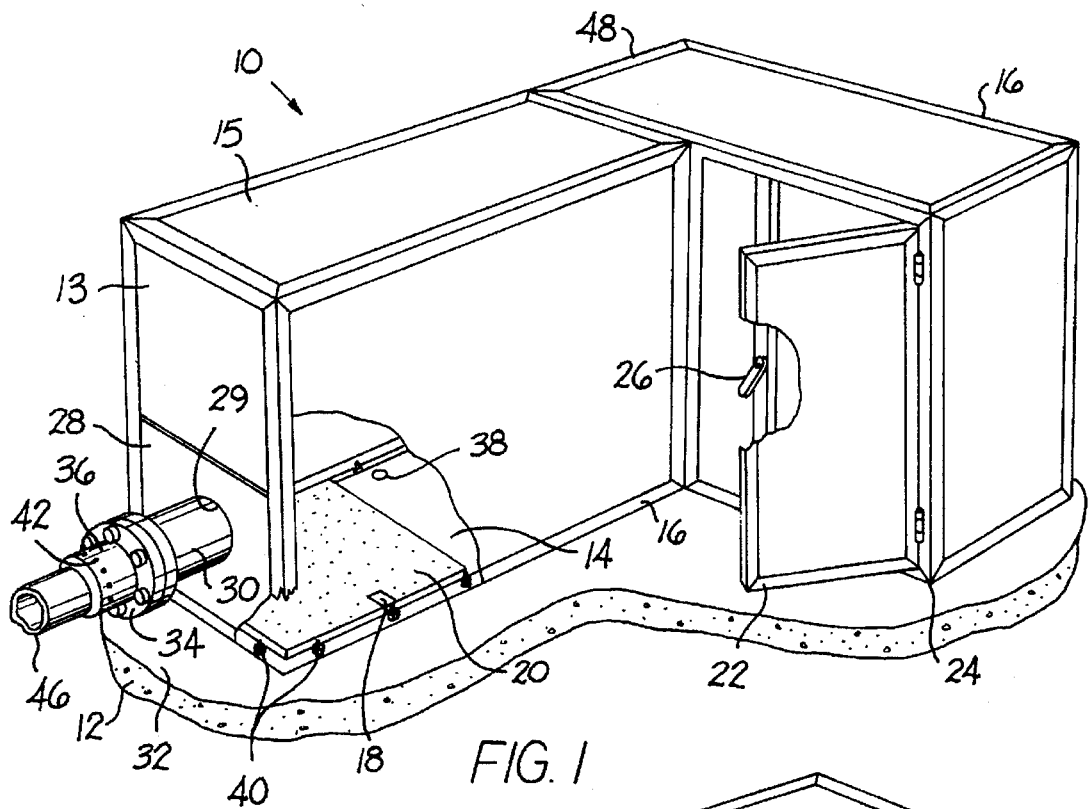
FIG. 1 is a perspective view of one embodiment of the invention partially in cross-section.
Figure 2:
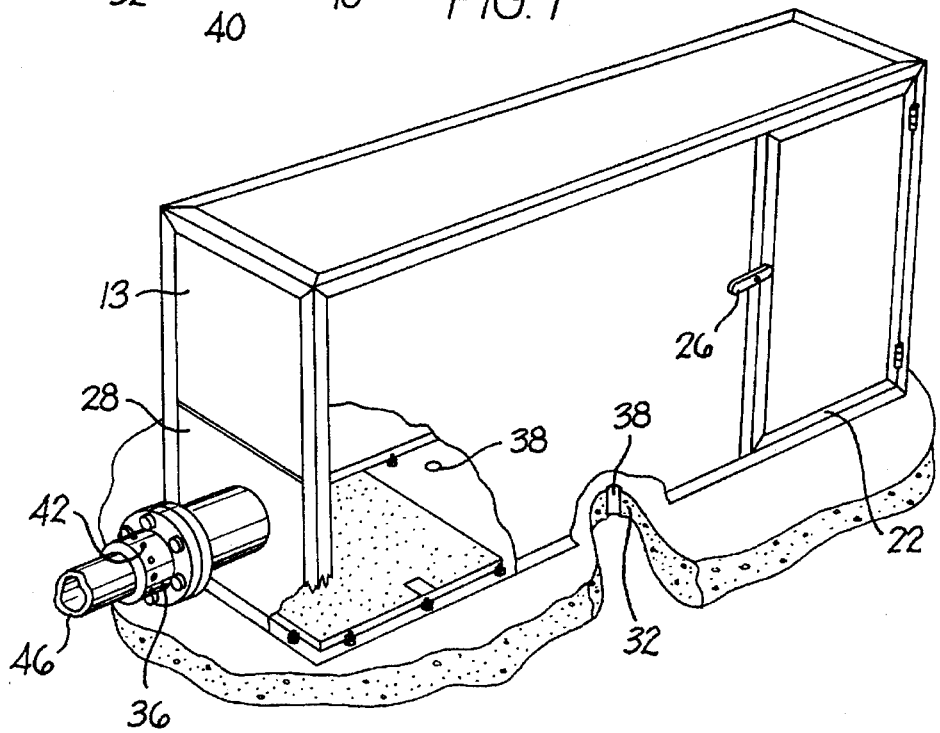
FIG. 2 is a perspective view of a second embodiment of the invention partially in cross-section.

Referring now to FIGS. 1 and 2, an end of the line sewage filter 10 is shown mounted on a concrete foundation 12. The sewage filter 10 is secured to the concrete foundation 12 by a plurality of concrete bolts and nuts 40. They are fitted into the foundation 12 and line up with corresponding holes in the metal framing 16 of the unit 10.

The filter unit 10 is made from a metal framing 16 which can be configured at a right angle as shown in FIG. 1 or in a straight line as shown in FIG. 2. These different configurations can be used in different applications. The size and shape of the filter unit 10 will depend on the particular application. The filter unit 10 is meant to be placed at the end of a sewage line, just prior to where the run off water dumps into a water way. The filter unit 10 could also be placed at any point along the sewage line, for filtering only a few storm drains. The amount of water being filtered, the water pressure and the desired amount of filtration are all factors which will determine the size and configuration of the filter unit 10.

The metal framing 16 forms a three-dimensional rectangular unit as shown in FIG. 2 or a three-dimensional L-shaped unit as shown in FIG. 1. The top 15, side 13, and bottom 14 faces of the unit 10 are formed from diamond plate stainless steel or any other suitable material. The bottom 14 is attached to a platform 32 formed from concrete or other suitable material. Material considerations are: the total number of drains to be filtered; the pressure of the water being filtered; and the frequency of cleaning.

A door 22 is formed at one end of the unit 10. This door is mounted on hinges 24 at one side and has a slide locking and handle mechanism 26 on the side which opens out. The door 22 provides access to the filter unit 10 for cleaning purposes.

At the opposite end of the filter unit 10 there is a metal plate 28 in which there is cut an opening 29 for the drain pipe. There is a two part flange piece 30 and 42. One portion 30 is welded to the plate 28 and feeds water directly into the filter unit 10 through the opening 29. The other portion 42 of the flange is welded or bolted to the sewage connector pipe 36. The two flange portions 42 and 30 are joined together at their flange ends 34. This joining can be bolts for a removable attachment or through welding for a permanent attachment.

Inside of the filter unit 10 there is anchored an oil filter mat 20. The oil filter mat 20 is positioned below the flow of water entering the unit 10 through the opening 29 on the bottom 14 of the filter unit 10. The oil filter mat 20 will filter out some of the oil present in the sewage water. The oil filter mat 20 is replaceable and can be replaced when the filter unit 10 is cleaned out. The oil filter mat 20 is held in place by a plurality of brackets 18 positioned on at least three sides of the filter unit 10.

Sewage water is filtered out through holes 38 positioned along the edges of the bottom 14 of the filter unit 10. The holes 38 bore through both the bottom 14 and the platform 26 to allow water to flow therethrough, but keep leaves and other debris within filter 10. The exact number and size of the holes will depend on the amount or quality of the filtration desired, the water pressure, the size of the material to filtered out, the number of drains to be filtered and the frequency of cleaning.

In practice the filter unit 10 will be attached to an existing sewage drainage pipe 46. The sewage connector pipe 36 will have an inner circumference which is slightly larger than the outer circumference of the sewage drainage pipe 46 so that there is an easy yet snug fit when the sewage connector pipe is fitted onto the sewage drainage pipe for installation. The sewage drainage pipe and the sewage connector pipe are attached by a series of bolts or any other well known means of attachment such as welding.

The water enters the filter through the sewage connector pipe 36 and flows out of the opening 29. The water hits the oil filter mat 20 and some of the oil is captured. The water then flows out the small drain holes 38 to either the waterway or another conduit pipe will eventually take the filtered water to a waterway.

Trash, leaves and other debris remain in the filter unit 10. Once a week, once a month or at any set interval, the device must be manually cleaned out. This is because as the filter unit fills up with trash and debris it ability to effectively filter water is greatly reduced.

Although the present invention has been described in considerable detail with reference to the preferred version thereof, other versions are possible. For example, the configuration of the filter unit could be substantially changed, the placement and size of the oil filter mat could be altered or even removed, and size and position of the drainage holes could be different. Therefore, the spirit and scope of the appended claims should not be limited to the description of the preferred versions contained herein.

What is claimed is:

1. A device for filtering sewage water, comprising:

a framing structure;

top, bottom and side members mounted on said framing structure, one of said side members having an aperture formed therein for receiving a pipe therethrough, said bottom member having a plurality of small drainage apertures for filtered water to flow therethrough to a sewage pipe or other waterway; wherein said framing and said top bottom and side members form a filter unit;

a door positioned at one end of said filter unit providing access for cleaning said filter unit;

an oil filter removably secured to said bottom member to filter out oil in said sewage water; and means for connecting a sewage line to said filter unit.

2. A device for filtering sewage water as recited in claim 1, wherein said top, bottom and side members are formed from a solid metal material.

3. A device for filtering sewage water as recited in claim 1, wherein said filter unit is mounted onto a concrete base, said base having apertures formed therein corresponding to said drainage apertures in said bottom member.

4. A device for filtering sewage water as recited in claim 1, wherein said door is hinge mounted to said framing structure and is secured with a locking mechanism.

5. A device for filtering sewage water as recited in claim 1, further comprising a plate attached to said side member having an aperture therein and wherein said means for connecting a sewage line to said filter unit is fixedly connected to said plate.

6. A device for filtering sewage water as recited in claim 5, wherein said means for connecting a sewage line to said filter unit is a pair of flanges and a sewage connector pipe having two ends such that one of said pair of flanges is attached to said plate; the other of said flanges is attached to one end of said sewage connector pipe; said flanges are bolted together; and said sewage line is connected to said sewage connector pipe.

7. A device for filtering sewage water as recited in claim 1, wherein said framing structure is formed of metal.

* * * * *